United States Patent
Chang

(10) Patent No.: US 8,049,238 B2
(45) Date of Patent: Nov. 1, 2011

(54) LIGHT EMITTING MODULE HAVING LIGHT GUIDE PLATE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 77 days.

(21) Appl. No.: 12/577,253

(22) Filed: Oct. 12, 2009

(65) Prior Publication Data
US 2010/0134015 A1  Jun. 3, 2010

(30) Foreign Application Priority Data
Dec. 2, 2008  (CN) .................. 2008 1 0305896.9

(51) Int. Cl.
*H01L 33/00* (2010.01)
(52) U.S. Cl. ............... 257/98; 257/79; 257/81; 257/82; 257/88; 257/91; 438/27; 438/28; 438/69
(58) Field of Classification Search .............. 257/81, 257/82, 83, 84, 85, 88, 91, 99, 79, E33.001, 257/98, 80, 89, 92, 431, 444, 13; 438/22, 438/24, 25, 26, 27, 28, 29, 46, 47, 48, 54, 438/60
See application file for complete search history.

(56) References Cited

U.S. PATENT DOCUMENTS

| | | | | |
|---|---|---|---|---|
| 7,824,073 B2* | 11/2010 | Hsieh et al. | ............. | 362/249.11 |
| 7,839,061 B2* | 11/2010 | Egi et al. | .................. | 313/110 |
| 2005/0001227 A1* | 1/2005 | Niki et al. | ................ | 257/98 |
| 2007/0068370 A1* | 3/2007 | Ting | ....................... | 84/645 |
| 2008/0283860 A1* | 11/2008 | Suehiro et al. | ............. | 257/98 |
| 2009/0046468 A1* | 2/2009 | Wang et al. | ............... | 362/297 |
| 2009/0273735 A1* | 11/2009 | Yeh | ............................ | 349/67 |
| 2010/0002026 A1* | 1/2010 | Seetzen et al. | ............... | 345/690 |

* cited by examiner

*Primary Examiner* — Ha Tran T Nguyen
*Assistant Examiner* — Thanh Y Tran
(74) *Attorney, Agent, or Firm* — Altis Law Group, Inc.

(57) ABSTRACT

A light emitting module includes a light source, a light guide plate, and a reflecting mask. The light source includes a circuit board and a light emitting device fixed on the circuit board. The light emitting device includes a plurality of light emitting elements and a control circuit. The light guide plate receives light from the light emitting device and exits from the light guide plate, includes a plurality of light emitting sidewalls, a plurality of reflection walls, and a receiving hole defined in the light guide plate. The receiving hole includes a plurality of light incident sidewalls. The reflecting mask covers the receiving hole, including a bottom surface and a plurality of reflecting surfaces.

20 Claims, 8 Drawing Sheets

LIGHT EMITTING MODULE HAVING LIGHT GUIDE PLATE

BACKGROUND

1. Technical Field

The present disclosure relates to light emitting modules, and particularly, to a light emitting module including a light guide plate.

2. Description of Related Art

Light emitting diodes (LED) provide many advantages, such as high luminance, low power consumption, good match with integrated circuits, long-term reliability and environmental friendliness. LEDs are thus preferred for use in the display devices over CCFLs (cold cathode fluorescent lamp), with wide application as a backlight source in liquid crystal displays (LCD).

A typical light emitting module includes a light guide plate and an array of point light sources. Light from the point light sources is converted to surface light and provides illumination for the display devices. Each of the point light sources is usually unified. However, as development of the display devices become more diverse, some devices may require point light sources supporting various colors.

Therefore, what is desired is a light emitting module addressing the limitations described.

BRIEF DESCRIPTION OF THE DRAWINGS

Many aspects of a light emitting module can be better understood with reference to the following drawings. The components in the drawings are not necessarily drawn to scale, the emphasis instead being placed upon clearly illustrating the principles of the present apparatus for assembling a machine tool. Moreover, in the drawings, like reference numerals designate corresponding parts throughout the several views.

DETAILED DESCRIPTION

Figure 1:
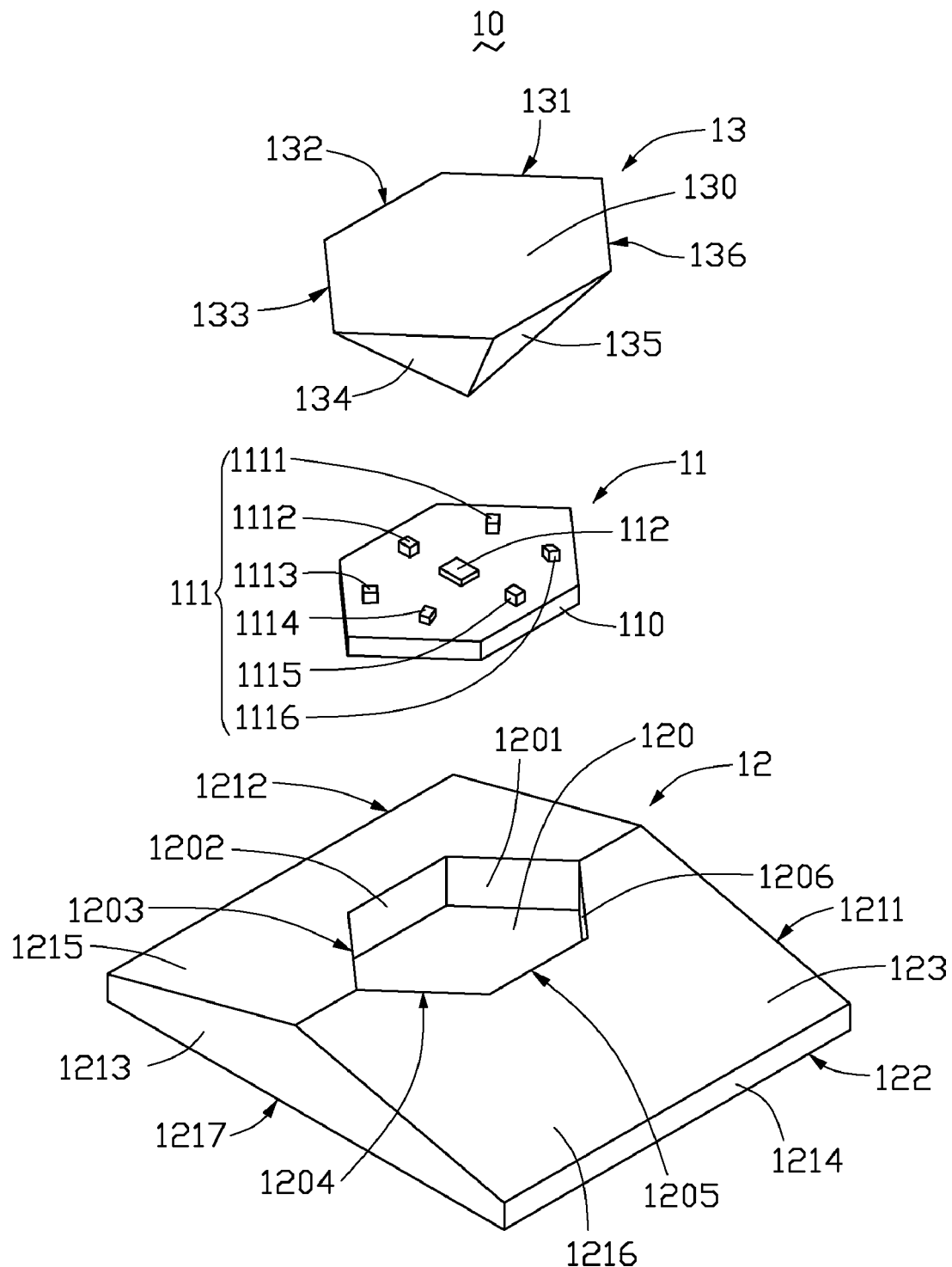
FIG. 1 is an exploded, isometric view of a light emitting module according to a first embodiment.
Figure 2:
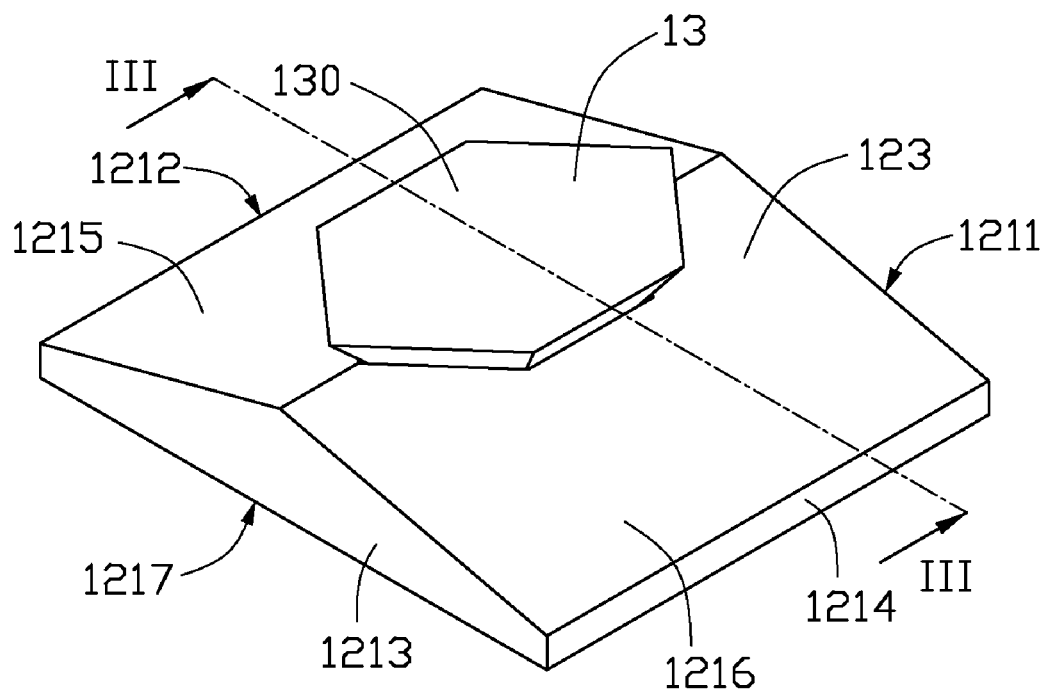
FIG. 2 is an assembled, isometric view of the light emitting module of FIG. 1.
Figure 3:
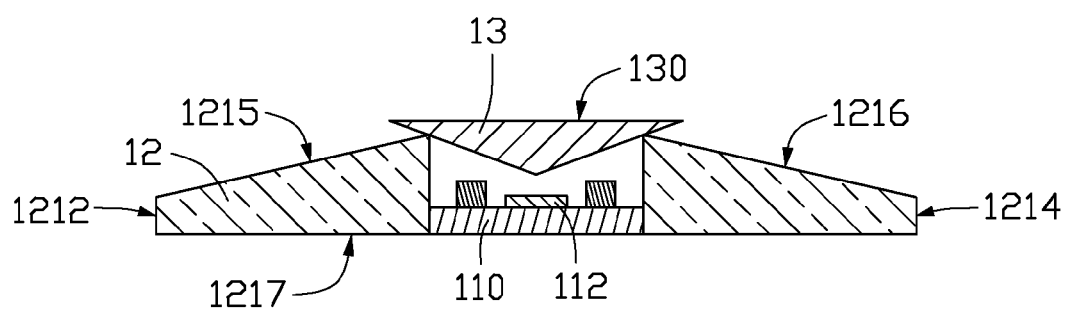
FIG. 3 is a cross section of the light emitting module of FIG. 2, taken along line III-III thereof.

Referring to FIGS. 1-3, a light emitting module 10 according to a first embodiment includes a light source 11, a light guide plate 12, and a reflecting mask 13.

The light source 11 includes a circuit board 110 and a light emitting device 111 fixed on the circuit board 110. The light emitting device 111 includes a plurality of light emitting elements. It will be appreciated that the light emitting elements can comprise a plurality of light-emitting diode (LED) chips, a plurality of LEDs, or a plurality of LED modules, all being equally applicable and remaining well within the scope of the disclosure. In the illustrated embodiment, the circuit board 110 is hexagonal, but the disclosure is not limited thereto. The light emitting device 111 includes a first emitting element 1111, a second emitting element 1112, a third emitting element 1113, a fourth emitting element 1114, a fifth emitting element 1115, and a sixth emitting element 1116. The first emitting element 1111, the second emitting element 1112, the third emitting element 1113, the fourth emitting element 1114, the fifth emitting element 1115, and the sixth emitting element 1116 emit light of various colors corresponding to a controlling signal. The circuit board 110 may include a heat dissipation device (not shown) mounted thereon for heat dissipation. The heat dissipation device may be a heat pipe, or a plurality of heat dissipation fins, for example.

Figure 4:
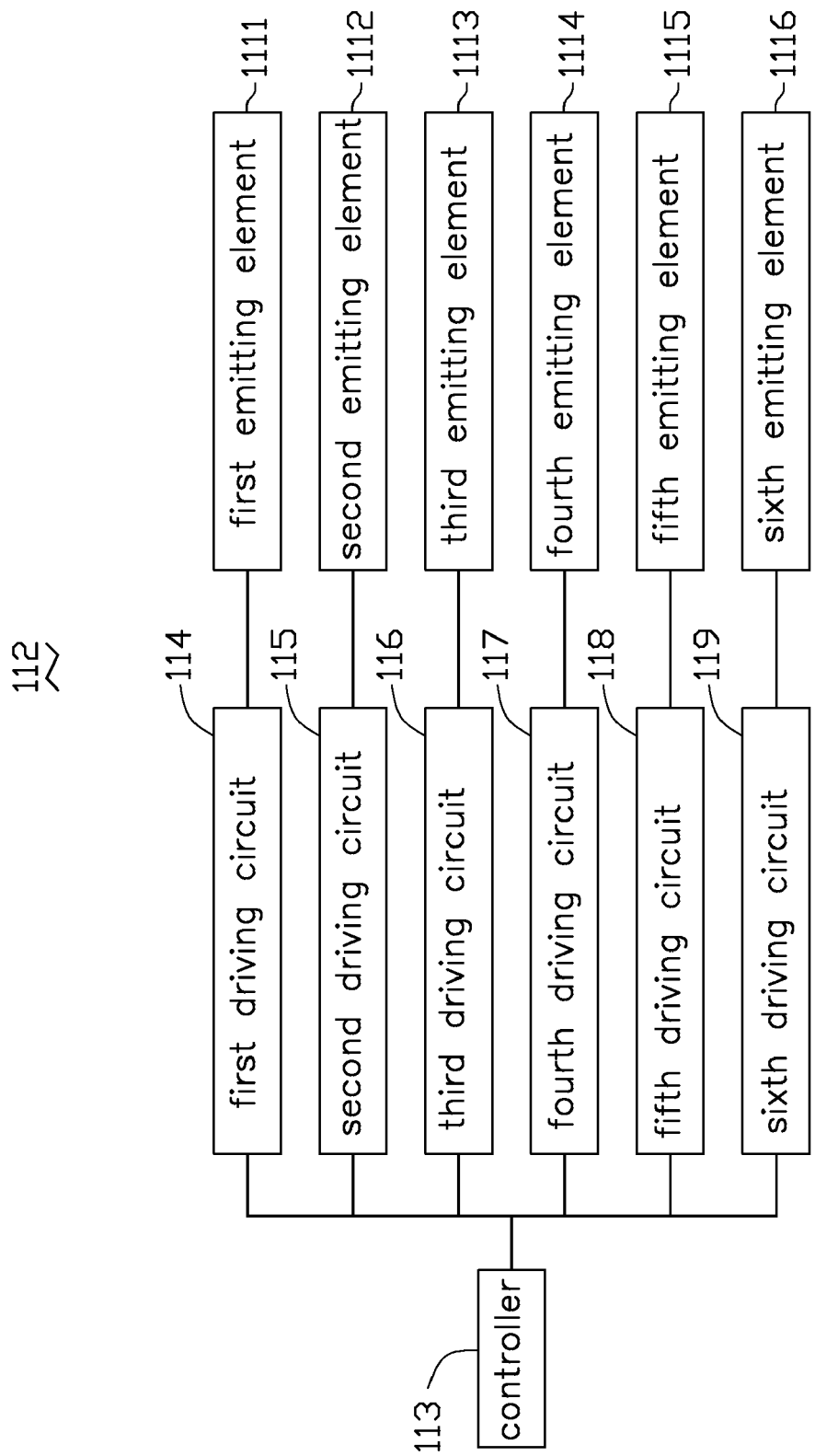
FIG. 4 is a schematic view of a control circuit of the light emitting module of FIG. 1.

Referring to FIG. 4, the light emitting device 111 further includes a control circuit 112 packaged on the circuit board 110. The control circuit 112 includes a controller 113 and a plurality of driving circuits opposite to the emitting elements 1111-1116. In the illustrated embodiment, the control circuit 112 includes a first driving circuit 114, a second driving circuit 115, a third driving circuit 116, a fourth driving circuit 117, a fifth driving circuit 118, and a sixth driving circuit 119. The first driving circuit 114 drives the first emitting element 1111. The second driving circuit 115 drives the second emitting element 1112. The third driving circuit 116 drives the third emitting element 1113. The fourth driving circuit 117 drives the fourth emitting element 1114. The fifth driving circuit 118 drives the fifth emitting element 1115. The sixth driving circuit 119 drives the sixth emitting element 1116. The controller 113 controls the first driving circuit 114, second driving circuit 115, the third driving circuit 116, the fourth driving circuit 117, the fifth driving circuit 118, and the sixth driving circuit 119.

The light guide plate 12 receives light from the light emitting device 111 using a receiving hole 120 defined in the light guide plate 12, which then exits from the light guide plate 12. In the illustrated embodiment, the light guide plate 12 is a pentagonal prism, but the disclosure is not limited thereto. The light guide plate 12 includes a first light emitting sidewall 1211, a second light emitting sidewall 1212, a third light emitting sidewall 1213, a fourth light emitting sidewall 1214, a first reflection wall 1215, a second reflection wall 1216, and a third reflection wall 1217. The first light emitting sidewall 1211 is opposite to the third light emitting sidewall 1213. The second reflection wall 1216, the first reflection wall 1215, the second light emitting sidewall 1212, the third reflection wall 1217, and the fourth light emitting sidewall 1214 are connected end-to-end. The second reflection wall 1216, the first reflection wall 1215, the second light emitting sidewall 1212, the third reflection wall 1217, and the fourth light emitting sidewall 1214 are connected between the third light emitting sidewall 1213 and first light emitting sidewall 1211. The second light emitting sidewall 1212 is opposite to the fourth light emitting sidewall 1214. The first light emitting sidewall 1211, the second light emitting sidewall 1212, the third light emitting sidewall 1213, and the fourth light emitting sidewall 1214 are perpendicular to the third reflection wall 1217.

The receiving hole 120 is hexagonal. A central axis of the receiving hole 120 is parallel to the first light emitting sidewall 1211, the second light emitting sidewall 1212, the third light emitting sidewall 1213, and the fourth light emitting sidewall 1214. The receiving hole 120 includes a first light incident sidewall 1201, a second light incident sidewall 1202, a third light incident sidewall 1203, a fourth light incident sidewall 1204, a fifth light incident sidewall 1205, and a sixth light incident sidewall 1206. The first light incident sidewall 1201, the second light incident sidewall 1202, the third light incident sidewall 1203, the fourth light incident sidewall 1204, the fifth light incident sidewall 1205, and the sixth light incident sidewall 1206 are connected end-to-end. The first light incident sidewall 1201 is opposite to the first emitting element 1111 and a side of the first light emitting sidewall 1211 is close to the second light emitting sidewall 1212. The second light incident sidewall 1202 is opposite to the second emitting element 1112 and the second light emitting sidewall 1212. The third light incident sidewall 1203 is opposite to the third emitting element 1113 and a side of the third light emitting sidewall 1213 is close to the second light emitting sidewall 1212. The fourth light incident sidewall 1204 is opposite to the fourth emitting element 1114 and a side of the third light emitting sidewall 1213 is close to the fourth light emitting sidewall 1214. The fifth light incident sidewall 1205 is opposite to the fifth emitting element 1115 and the fourth light emitting sidewall 1214. The sixth light incident sidewall 1206 is opposite to the sixth emitting element 1116 and a side of the first light emitting sidewall 1211 is close to the fourth light emitting sidewall 1214.

The reflecting mask 13 covers the receiving hole 120. The reflecting mask 13 includes a plurality of reflecting surfaces opposite to the emitting elements and the light incident sidewalls. In the illustrated embodiment, the reflecting mask 13 is a hexagonal pyramid. The reflecting mask 13 includes a bottom surface 130, a first reflecting surface 131, a second reflecting surface 132, a third reflecting surface 133, a fourth reflecting surface 134, a fifth reflecting surface 135, and a sixth reflecting surface 136. The first reflecting surface 131 is opposite to the first emitting element 1111. The light emitted from the first emitting element 1111 enters the first light incident sidewall 1201 from the first reflecting surface 131, then passes through from the side of the first light emitting sidewall 1211 close to the second light emitting sidewall 1212, and finally exits from the side of the first light emitting sidewall 1211 close to the second light emitting sidewall 1212. The second reflecting surface 132 is opposite to the second emitting element 1112. The light emitted from the second emitting element 1112 enters the second light incident sidewall 1202 from the second reflecting surface 132, then passes through from the second light emitting sidewall 1212, and finally exits from the second light emitting sidewall 1212. The third reflecting surface 133 is opposite to the third emitting element 1113. The light emitted from the third emitting element 1113 enters the third light incident sidewall 1203 from the third reflecting surface 133, then passes through from the side of the third light emitting sidewall 1213 close to the second light emitting sidewall 1212, and finally exits from the side of the third light emitting sidewall 1213 close to the second light emitting sidewall 1212. The fourth reflecting surface 134 is opposite to the fourth emitting element 1114. The light emitted from the fourth emitting element 1114 enters the fourth light incident sidewall 1204 from the fourth reflecting surface 134, then passes through from the side of the third light emitting sidewall 1213 close to the fourth light emitting sidewall 1214, and finally exits from the side of the third light emitting sidewall 1213 close to the fourth light emitting sidewall 1214. The fifth reflecting surface 135 is opposite to the fifth emitting element 1115. The light emitted from the fifth emitting element 1115 enters the fifth light incident sidewall 1205 from the fifth reflecting surface 135, then passes through from the fourth light emitting sidewall 1214, and finally exits from the fourth light emitting sidewall 1214. The sixth reflecting surface 136 is opposite to the sixth emitting element 1116. The light emitted from the sixth emitting element 1116 enters the sixth light incident sidewall 1206 from the sixth reflecting surface 136, then passes through from the side of the first light emitting sidewall 1211 close to the second reflection wall 1216, and finally exits from the side of the first light emitting sidewall 1211 close to the second reflection wall 1216. The bottom surface 130 of the reflecting mask 13 protrudes out from the light guide plate 12, that is, the bottom surface 130 is not coplanar with the first reflection wall 1215 or the second reflection wall 1216.

Although the receiving hole 120 is shown as being hexagonal, it will be appreciated that the receiving hole 120 may be any other suitable shape, such as, for example, circular, rectangular, pentagonal, heptagonal, or the like. It should be understood that the shape of the recesses 121 is not limited to hexagonal pyramid, as long as the reflecting mask 13 covers the receiving hole 120.

Figure 5:
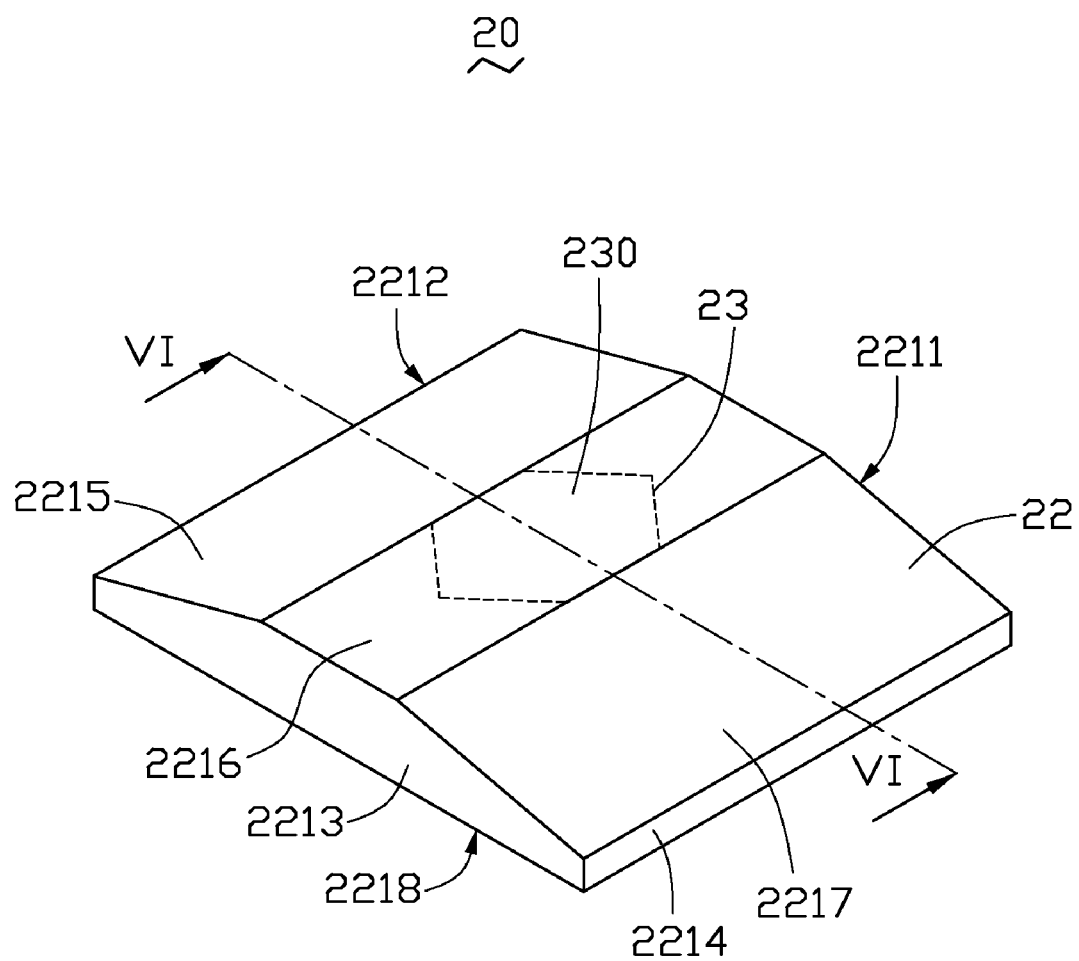
FIG. 5 is an assembled, isometric view of a light emitting module according to a second embodiment.
Figure 6:
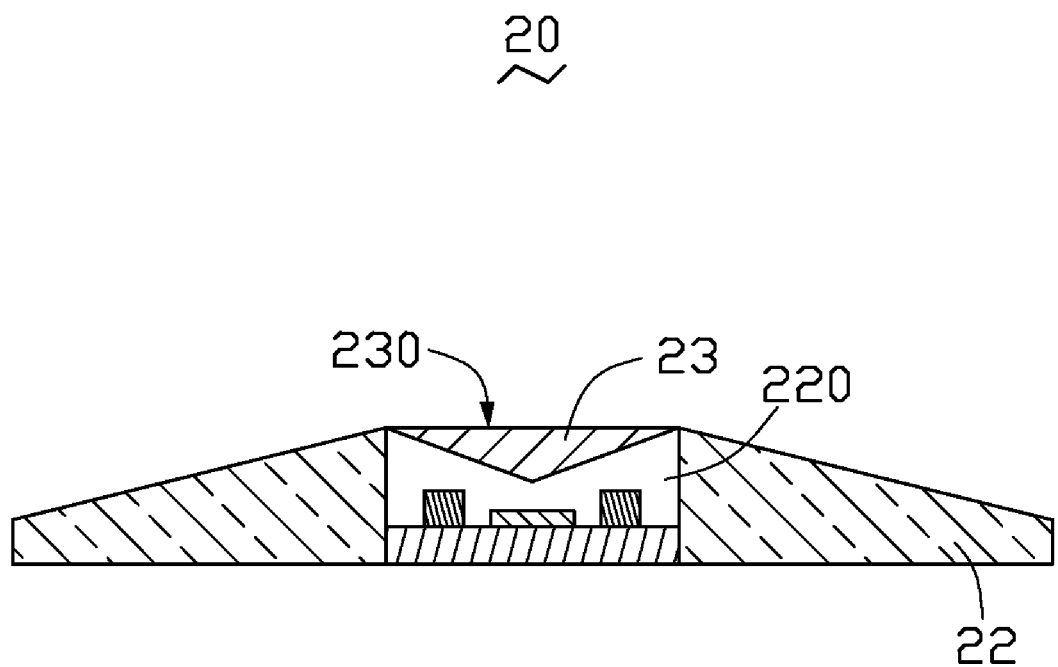
FIG. 6 is a cross section of the light emitting module of FIG. 5, taken along line VI-VI thereof.

Referring to FIGS. 5 and 6, a light emitting module 20 according to a second embodiment differs from light emitting module 10 in that a reflecting mask 23 is integrally formed on a light guide plate 22. A receiving hole 220 is defined in the light guide plate 22. The light guide plate 22 is a hexagonal prism. The light guide plate 22 includes a first light emitting sidewall 2211, a second light emitting sidewall 2212, a third light emitting sidewall 2213, a fourth light emitting sidewall 2214, a first reflection wall 2215, a second reflection wall 2216, a third reflection wall 2217 and a fourth reflection wall 2218. The first light emitting sidewall 2211 is opposite to the third light emitting sidewall 2213. The second light emitting sidewall 2212, the fourth reflection wall 2218, the fourth light emitting sidewall 2214, the third reflection wall 2217, the second reflection wall 2216, and the first reflection wall 2215 are connected end-to-end. The second light emitting sidewall 2212, the fourth reflection wall 2218, the fourth light emitting sidewall 2214, the third reflection wall 2217, the second reflection wall 2216, and the first reflection wall 2215 are connected between the third light emitting sidewall 2213 and first light emitting sidewall 2211. The second light emitting sidewall 2212 is opposite to the fourth light emitting sidewall 2214. The first light emitting sidewall 2211, the second light emitting sidewall 2212, the third light emitting sidewall 2213, and the fourth light emitting sidewall 2214 are perpendicular to the fourth reflection wall 2218. The receiving hole 220 is hexagonal. A central axis of the receiving hole 220 is parallel to the first light emitting sidewall 2211, the second light emitting sidewall 2212, the third light emitting sidewall 2213, and the fourth light emitting sidewall 2214. A bottom surface 230 of the reflecting mask 23 is coplanar with the second reflection wall 2216 of the light guide plate 22.

Figure 7:
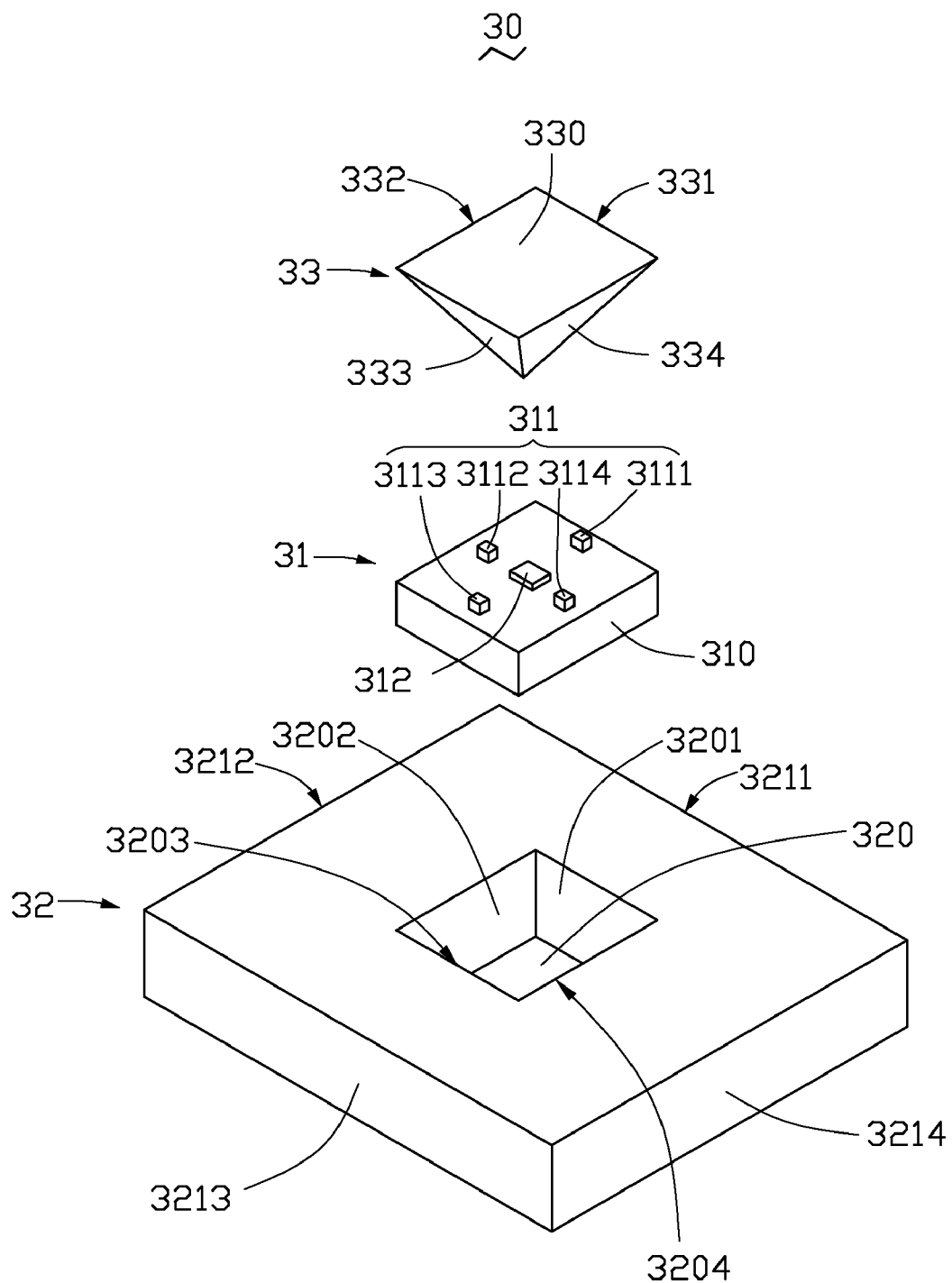
FIG. 7 is an exploded, isometric view of a light emitting module according to a third embodiment.
Figure 8:
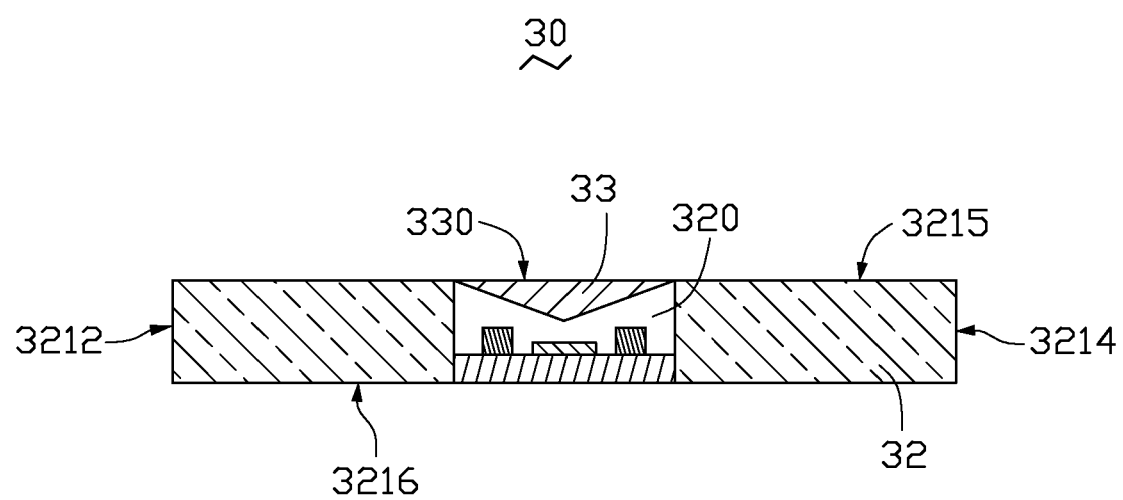
FIG. 8 is a cross section of the light emitting module according to the third embodiment.

Referring to FIGS. 7 and 8, a light emitting module 30 according to a third embodiment differs from light emitting module 10 in that a circuit board 310 is square. A light emitting device 311 includes a first emitting element 3111, a second emitting element 3112, a third emitting element 3113, and a fourth emitting element 3114. A light guide plate 32 is rectangular. A receiving hole 320 is defined in the light guide plate 32. The light guide plate 32 includes a first light emitting sidewall 3211, a second light emitting sidewall 3212, a third light emitting sidewall 3213, a fourth light emitting sidewall 3214, a first reflection wall 3215, and a second reflection wall 3216. The first light emitting sidewall 3211 is opposite to the third light emitting sidewall 3213. The second light emitting sidewall 3212 is opposite to the fourth light emitting sidewall 3214. The first light emitting sidewall 3211, the second light emitting sidewall 3212, the third light emitting sidewall 3213, and the fourth light emitting sidewall 3214 are connected between the first reflection wall 3215 and second reflection wall 3216. A central axis of the receiving hole 320 is parallel to the first light emitting sidewall 3211, the second light emitting sidewall 3212, the third light emitting sidewall 3213, and the fourth light emitting sidewall 3214. A central axis of the receiving hole 320 is parallel to the first light emitting sidewall 3211, the second light emitting sidewall 3212, the third light emitting sidewall 3213, and the fourth light emitting sidewall 3214. The receiving hole 320 includes a first light incident sidewall 3201, a second light incident sidewall 3202, a third light incident sidewall 3203, and a fourth light incident sidewall 3204. The first light incident sidewall 3201, the second light incident sidewall 3202, the third light incident sidewall 3203, and the fourth light incident sidewall 3204 are connected end-to-end. A reflecting mask 33 is a square pyramid. The reflecting mask 33 includes a bottom surface 330, a first reflecting surface 331, a second reflecting surface 332, a third reflecting surface 333, and a fourth reflecting surface 334. The first reflecting surface 331 is opposite to the first emitting element 3111. Light emitted from the first emitting element 3111 enters the first light incident sidewall 3201 from the first reflecting surface 331, then passes through from the first light emitting sidewall 3211, and finally exits from the first light emitting sidewall 3211. The second reflecting surface 332 is opposite to the second emitting element 3112. Light emitted from the second emitting element 3112 enters the second light incident sidewall 3202 from the second reflecting surface 332, then passes through from the second light emitting sidewall 3212, and finally exits from the second light emitting sidewall 3212. The third reflecting surface 333 is opposite to the third emitting element 3113. Light emitted from the third emitting element 3113 enters the third light incident sidewall 3203 from the third reflecting surface 333, then passes through from the third light emitting sidewall 3213, and finally exits from the third light emitting sidewall 3213. The fourth reflecting surface 334 is opposite to the fourth emitting element 3114. Light emitted from the fourth emitting element 3114 enters the fourth light incident sidewall 3204 from the fourth reflecting surface 334, then passes through from the fourth light emitting sidewall 3214, and finally exits from the fourth light emitting sidewall 3214. The bottom surface 330 of the reflecting mask 33 is coplanar with the first reflection wall 3215.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light emitting module, comprising:
   a light source comprising a circuit board, and a light emitting device fixed on the circuit board, wherein the light emitting device comprises a plurality of light emitting elements and a control circuit, the light emitting elements being arranged on peripheral edges of the circuit board;
   a light guide plate comprising a plurality of light emitting sidewalls, a plurality of reflection walls, and a receiving hole defined in the light guide plate, wherein the receiving hole comprises a plurality of light incident sidewalls, each light incident sidewall being opposite to a corresponding light emitting element, wherein light is received from the light emitting device and exits through the light guide plate; and
   a reflecting mask covering the receiving hole, comprising a bottom surface and a plurality of reflecting surfaces, each reflecting surface being opposite to a corresponding light emitting element.

2. The light emitting module of claim 1, wherein the light emitting elements comprise a plurality of light-emitting diode (LED) chips, a plurality of LEDs, or a plurality of LED modules.

3. The light emitting module of claim 1, wherein the circuit board is hexagonal-shaped.

4. The light emitting module of claim 1, wherein the circuit board further comprises a heat dissipation device mounted on the circuit board, wherein the heat dissipation device comprises heat pipe or a plurality of heat dissipation fins.

5. The light emitting module of claim 1, wherein the control circuit comprises a controller and a plurality of driving circuits opposite to the emitting elements.

6. The light emitting module of claim 1, wherein the light guide plate is a pentagonal-shaped prism.

7. The light emitting module of claim 1, wherein the receiving hole is hexagonal-shaped and comprises a central axis parallel to the light emitting sidewalls.

8. The light emitting module of claim 1, wherein the reflecting mask is a hexagonal-shaped pyramid.

9. A light emitting module, comprising:
   a light source comprising a circuit board and a light emitting device fixed on the circuit board, wherein the light emitting device comprises a plurality of light emitting elements and a control circuit, the light emitting elements being arranged on peripheral edges of the circuit board;
   a light guide plate comprising a plurality of light emitting sidewalls, a plurality of reflection walls, and a receiving hole defined in the light guide plate, wherein the receiving hole comprises a plurality of light incident sidewalls, each light incident sidewall being opposite to a corresponding light emitting element, wherein light is received from the light emitting device and exits through the light guide plate; and
   a reflecting mask integrally formed on a light guide plate, comprising a bottom surface and a plurality of reflecting surfaces, each reflecting surface being opposite to a corresponding light emitting element.

10. The light emitting module of claim 9, wherein the light emitting elements comprise a plurality of light-emitting diode (LED) chips, a plurality of LEDs, or a plurality of LED modules.

11. The light emitting module of claim 9, wherein the circuit board is hexagonal-shaped.

12. The light emitting module of claim 9, wherein the circuit board further comprises a heat dissipation device mounted on the circuit board, wherein the heat dissipation device comprises heat pipe, or a plurality of heat dissipation fins.

13. The light emitting module of claim 9, wherein the control circuit comprises a controller and a plurality of driving circuits opposite to the emitting elements.

14. The light emitting module of claim 9, wherein the light guide plate is a hexagonal-shaped prism.

15. The light emitting module of claim 9, wherein the receiving hole is hexagonal-shaped, and a central axis of the receiving hole is parallel to the light emitting sidewalls.

16. The light emitting module of claim 9, wherein the reflecting mask is a hexagonal-shaped pyramid.

17. A light emitting module, comprising:
   a light source comprising a circuit board and a light emitting device fixed on the circuit board, wherein the circuit board is square-shaped, wherein the light emitting device comprises a plurality of light emitting elements and a control circuit, the light emitting elements being arranged on peripheral edges of the circuit board;

a light guide plate comprising a plurality of light emitting sidewalls, a plurality of reflection walls, and a receiving hole defined in the light guide plate, wherein the light guide plate is rectangular-shaped, and wherein the receiving hole comprises a plurality of light incident sidewalls, each light incident sidewall being opposite to a light emitting element, and wherein light is received from the light emitting device and exits through the light guide plate; and a reflecting mask covering the receiving hole, comprising a bottom surface and a plurality of reflecting surfaces, each reflecting surface being opposite to a light emitting element.

18. The light emitting module of claim 17, wherein the light emitting elements comprise a plurality of light-emitting diode (LED) chips, a plurality of LEDs, or a plurality of LED modules, and wherein the control circuit comprises a controller and a plurality of driving circuits opposite to the emitting elements.

19. The light emitting module of claim 17, wherein the circuit board further comprises a heat dissipation device mounted on the circuit board, and wherein the heat dissipation device comprises heat pipe, or a plurality of heat dissipation fins.

20. The light emitting module of claim 17, wherein a central axis of the receiving hole is parallel to the light emitting sidewalls.

* * * * *